United States Patent Office 3,397,243
Patented Aug. 13, 1968

3,397,243
PROCESS FOR THE PRODUCTION OF MERCAPTANS AND SULFIDES FROM ALPHA OLEFINS
George F. Kite, Springdale, Pa., assignor to Gulf Research & Development Company, Pittsburgh, Pa., a corporation of Delaware
No Drawing. Filed Aug. 9, 1965, Ser. No. 478,464
17 Claims. (Cl. 260—609)

ABSTRACT OF THE DISCLOSURE

A process for the preparation of mercaptans and sulfides by reacting a compound such as an alpha olefin under substantially anhydrous conditions with liquid hydrogen sulfide in the presence of both an acyclic azo initiator and a finely divided elemental metal from the Iron Group metals of the Fourth Period of Group VIII of the Periodic Table. The ratio of mercaptans to sulfides in the product can be increased by the addition to the above reaction mixture of a mono or bis-thiolester.

---

This invention relates to an improved process for the production of sulfur-containing products, especially primary mercaptans.

The conversion of alpha-olefinically unsaturated organic compounds to mercaptans and sulfides by reaction with liquid hydrogen sulfide is old in the art. The prior art processes suffer, however, from poor conversions of the unsaturated organic compounds to sulfur-containing products and/or poor selectivity to the production of the more valuable mercaptans.

It is the primary object of the present invention to provide a process for the substantially quantitative conversion of alpha-olefinically unsaturated compounds to sulfur-containing products with an improved selectivity of the process for the production of mercaptans.

In accordance with the invention, an improved process for the conversion of alpha-olefinically insaturated compounds to sulfur-containing products comprises reacting at least one alpha-olefinically unsaturated organic compound under substantially anhydrous conditions with liquid hydrogen sulfide in the presence of an azo compound which has an acyclic azo, —N=N—, group bonded to discrete non-aromatic carbons, at least one of which is tertiary and has attached, through carbon, a negative radical which has the three remaining valences of said carbon satisfied only by elements of the class consisting of oxygen and nitrogen, and at least one finely divided elemental metal from the Iron Group metals from the Fourth Period of Group VIII of the Periodic Table.

In one embodiment of the invention, the selectivity to the production of mercaptans is increased by the addition of a thioester to the anhydrous azo compound-finely divided metal system described above.

The charge stock for the process of this invention can be any alpha-olefinically unsaturated organic compound, that is, any organic compound which contains at least one terminal carbon to carbon double bond. The preferred alpha-olefinically unsaturated organic compounds are the alpha-monoolefinic hydrocarbons having between 2 and 30 carbon atoms per molecule and, in particular, the straight-chain alpha-monoolefinic hydrocarbons having between 8 and 16 carbon atoms per molecule. Dienes which have at least one terminal carbon to carbon double bond and other alpha-olefinically unsaturated organic compounds well known in the art as reactable with hydrogen sulfide can also be employed, and suitably have between 4 and 30 carbon atoms per molecule and preferably have between 8 and 20 carbon atoms per molecule. These other alpha-olefinically unsaturated organic compounds include alpha-olefinically unsaturated hydrocarbons substituted with halogens, nitrogen groups, amino, etc. or alpha-olefinically unsaturated organic compounds containing ether, thioether, or other non-hydrocarbon linkages.

Mixtures of olefins can also be employed, such as those prepared by wax cracking or the polymerization of ethylene and propylene. The charge stock can contain unreacted diluent materials, such as saturated cyclic and alicyclic hydrocarbons. Certain diluent materials which tend to react with the various components of the reaction mixture are, however, undesirable. Perhaps the most common unwanted diluent materials are alcoholic hydroxy-containing compounds, such as water and organic alcohols. Water, for example, reacts with the thioester catalyst to be described below to produce an equilibrium amount of a carboxylic acid and a mercaptan. Thus a portion of the thioester is utilized in undesirable side reactions. It is therefore preferred that the alpha-olefinically unsaturated charge stock be substantially free of alcoholic hydroxyl groups, and in particular substantially dry, i.e. substantially free of water. By substantially dry is meant a water content less than the amount required to saturate the alpha-olefinically unsaturated organic compound under the temperature and pressure of reaction and preferably less than 100 p.p.m.

Suitable alpha-olefinically unsaturated organic compounds which can be used in the process of this invention include, for example, ethylene, propylene, 1-butene, isobutene, 1-pentene, 1-hexene, 1-octene, 2-methylhexene-1, 3-methyl-2-ethyl-1-pentene, 1 - nonene, 3,3 - dimethyl-1-heptene, 4-methyl-2-propyl-1-pentene, 1-decene, 3,7-dimethyl-1-octene, 1-undecene, 2-butyl - 1 - octene, 1-tridecene, 1-pentadecene, 1-hexadecene, 1-heptadecene, 1-tetracosene, 1-hentriacontene, styrene, vinylcyclohexane, 3-phenyl-1-pentene, 1,3-pentadiene, 1,3-butadiene, 1,4-pentadiene, 1,5-hexadiene, 1,6-octadiene, 3,4-diethyl-1,5-hexadiene, 6-phenyl-1-hexene, 2-ethyl-3-phenyl-1-butene, propylene dimer, propylene trimer, propylene tetramer, 3-chloro-1-hexene, 5-nitro-1-pentene, 4(dimethylamino)-1-octene, n-butyl vinyl ether, n-butyl vinyl thioether, p-chloro-styrene, and m-nitro-styrene.

The alpha-olefinically unsaturated organic compound is reacted with liquid hydrogen sulfide to produce the desired sulfur-containing compounds. The liquid hydrogen sulfide should also be substantially anhydrous. By substantially anhydrous is meant liquid hydrogen sulfide having less than 100 p.p.m. of water. The hydrogen sulfide should be low in water content for the same reason as given above for the alpha-olefinically unsaturated charge stock. The molar ratio of liquid hydrogen sulfide to the alpha-olefinically unsaturated organic compound can be between 1:1 and 20:1 and is preferably between 2:1 and 10:1.

The reaction time between the liquid hydrogen sulfide and the alpha-olefinically unsatured organic compound occurs under substantially anhydrous conditions and in the presence of an azo compound initiator and a finely divided elemental metal promoter selected from the Iron Group of the Fourth Period of Group VIII of the Periodic Table.

The azo compound initiator is one which has an acyclic azo, —N=N—, group bonded to discrete non-aromatic carbons, at least one of which is tertiary and has attached, through carbon, a negative radical which has the three remaining valences of said carbon satisfied only by elements of the class consisting of oxygen and nitrogen.

The negative radicals are preferably neutral with respect to acidity and include the nitrile, carbonamide and carbalkoxy groups. A description of these azo initiators along with an extensive list of examples can be found in U.S. Patent 2,551,813 issued May 8, 1961 to Paul Pinkney. Typical azo compounds described by Pinkney and usable in the process of this invention include, for example, alpha (carbamylazo)isobutyronitrile; azo initiators which are symmetrical and accordingly have two tertiary groups attached to the azo nitrogens, i.e., have a tertiary carbon attached to each azo nitrogen, such as alpha,alpha'- azodiisobutyronitrile; alpha,alpha' - azobis-(alpha,gamma-dimethyl - valeronitrile); alpha,alpha'-azobis(alpha-methyl-gamma - carboxybutyronitrile); and the corresponding salts, such as the sodium salt of the carboxy group, 1,1'-azodicyclohexanecarbonitrile; and 1,1'-azodicyclohexanecarbonamide.

Generally, the more useful azo catalysts have aliphatic and/or cycloaliphatic radicals having between 4 and 11 carbon atoms on each of the azo nitrogens and usually have carbon and hydrogen, or carbon, hydrogen and oxygen as the elements in the radical accepting the negative substituents on the tertiary carbon. Preferably the catalysts are symmetrical azobis nitriles having hydrocarbon radicals as the only other substituents. The azobis (cyanoalkanes) having between 4 and 11 carbon atoms are particularly preferred.

The amount of azo compound to employ in the reaction system will vary in amounts between about 0.25 and 5 mole percent based on the alpha-olefinically unsaturated organic compound. The preferred amounts usually are between 0.5 and 3 mole percent. Smaller or greater concentrations of the azo compound can be employed, if desired.

The production of sulfur-containing compounds by the reaction of hydrogen sulfide with alpha-olefinically unsaturated organic compounds in the presence of azo type compounds is disclosed in U.S. Patent 2,551,813, noted above. It has been found that the conversion of the alpha-olefinically unsaturated organic compounds to the desired sulfur-containing products is unexpectedly increased, and substantially quantitative conversions are obtained by the addition of a finely divided elemental metal promoter selected from the group consisting of iron, cobalt and nickel which make up the elements of the Fourth Period of Group VIII of Mendelyeev's Periodic Table of elements. It has been found, however, that this phenomenon is true only when the azo type free radical initiators are employed, as contrasted to the use of organic peroxide type free radical initiators, such as ditertiarybutyl peroxide. It has also been found that the use of a finely divided metal, as defined, and an azo compound, as defined, has more than an additive effect on the conversion of the alpha-olefinically unsaturated organic compound only when the reaction system is substantially anhydrous. It has been found, therefore, that in order to obtain substantially quantitative conversions of an alpha-olefinically unsaturated organic compound to sulfur-containing products, there must be present simultaneously an azo compound, a finely divided elemental metal from the Fourth Period of Group VIII of the Periodic Table and the reaction system must be anhydrous.

The amount of finely divided elemental metal to employ can be between 1 and 50 weight percent based on the olefinic reactant, with preferred concentrations between 10 and 30 weight percent. Lesser amounts of metal will result in lower conversions and greater amounts of metal have no advantage. The preferred metal is nickel. The metal must be in elemental form and not combined with oxygen, etc. It is understood, of course, that physical mixtures of the metals and alloys thereof can be employed. The metal must also be finely divided in order to present enough surface area for the promotion of the reaction, the surface of a stainless steel reaction, for example, not being considered "finely divided" so as to promote the subject reaction. By a finely divided metal is meant in a physically finely divided state, such as, powdered metal, steel wool, wire, shredded metal, or deposited on a high surface area support (more than one square meter per gram). The metals can be deposited in any suitable manner, for example, from solutions of the metal salts, which on calcining after deposition, converts the metal salt to the elemental metal form. The amount of metal deposited on the support can vary between 1 and 50 weight percent of the support, but is usually between 1 and 10 weight percent of the support.

The reaction temperature must be sufficiently high to decompose the azo catalyst into free radicals. In general, the reaction temperature can be between 40° C. and 150° C., but temperatures are usually between 50° C. and 120° C. The exact temperature to employ will depend, of course, on the particular azo catalyst which is chosen, the particular alpha-olefinically unsaturated reactant, and the reaction rate desired.

The reaction pressure should be sufficient to maintain the hydrogen sulfide in the liquid state. Pressures can vary between 200 and 2000 p.s.i. or higher, the exact pressure not being critical. The reaction can take place in the presence of non-reactive diluents, such as cyclohexane, n-heptane, aromatic, such as benzene, xylene, etc. It is preferred to employ a diluent which is a mutual solvent for the hydrogen sulfide and the olefinic reactant so as to promote the contacting of these materials. In addition, the diluent serves to reduce the over-all reaction pressure since the diluent acts as a solvent for the hydrogen sulfide. On the other hand, the non-reactive diluents utilize needed reactor volume which results in reduced space-time-yields of product.

Reaction times of between one minute and twenty-four hours can be employed with preferred reaction times between about fifteen minutes and five hours. The optimum reaction conditions will, of course, vary depending on the particular reactants, initiators and amounts of these materials which are employed. However, the conditions will generally fall within the ranges disclosed above.

The reaction can be run in a batch system, a continuous operation, or in a series of reactors. For example, all of the hydrogen sulfide, alpha-olefin, azo compound and metal can be added at once or the olefin and hydrogen sulfide can be added as separate streams to a continuous reactor system with an appropriate addition of the azo compound and metal in the desired proportions, either separately or along with the olefin or hydrogen sulfide. If desired, a coil reactor can also be employed with injection of the azo compound along the coil at various points.

In one embodiment of this invention, the reaction between the liquid hydrogen sulfide and the alpha-olefinically unsaturated organic compound occurs in the simultaneous presence of an azo compound initiator, as defined above, a finely divided elemental metal promoter, as defined above, and a thioester catalyst. The addition of the thioester catalyst results in a process having an increased selectivity to the production of mercaptans rather than sulfides, while maintaining the high levels of conversion. This result was unexpected since the addition of the thioester to the azo-initiated system without the presence of nickel resulted in a decreased conversion and a decreased selectivity to the production of the desired mercaptans.

Any thioester can be employed in the process of this invention. By the term thioester is meant to include any compound which will serve as a precursor to the thioester. By a thioester precursor is meant any compound which, under the conditions of the reaction, will be converted into a thioester. Such precursors include, for example, organic acids, ketenes, thioacids and organic acid anhydrides, each of which in the presence of hydrogen sulfide and an alpha-olefinically unsaturated organic compound, as defined above, will form the thioesters. The acid portion of the thioester can suitably have between 2 and 30 carbon atoms and is preferably a short chain fatty acid having between 2 and 5 carbon atoms. For example, one method of preparing a thioester is by the reaction of hydrogen sulfide and an alpha-olefin with the anhydrides of acetic, propionic, butyric, valeric, tetradecanoic, isobutyric, 3-ethyl decanoic and 3-phenyl propionic acids. The thiol portion of the thioester can suitably be prepared from an alpha-olefin as defined above for the charge stock. It is preferred that the thiol portion of the thioester be the same as the alpha-olefin used as the charge stock, although this is not required.

The list of suitable thioesters includes, but is not limited to, methyl thiolacetate, ethyl thiolacetate, propyl thiolacetate, n-butyl thiolacetate, n-hexyl thiolaceate, n-dodecyl thiolacetate, n-hexadecyl thiolacetate, n-tetracosyl thiolacetate, 2-methyl-1-hexyl thiolacetate, 2-butyl-1-octyl thiolacetate, 1,4-butyl dithiolacetate, 1,6-hexyl dithiolacetate, 2-phenyl-1-ethyl thiolacetate, ethyl thiolhexanoate, ethyl thioldecanoate, n-hexyl thiolhexanoate, n-hexyl thioldodecanoate, n-dodecyl thiolhexanoate, n-dodecyl thioldodecanoate, 4-methyl-2-propyl-1-pentyl thiolhexanoate, isobutyl thiolisobutyrate, 3-phenyl-1-propyl thiolacetate, 3-phenyl-1-propyl thiolhexanoate, 6-phenyl-1-hexyl thioldodecanoate, 1-methyl-1-hexyl thiolacetate, cyclohexyl thiolacetate, cyclohexyl thioldecanoate, cyclooctyl thiolacetate, and ethyl thioltriacontanoate.

As noted above, the acyl portion of the thioester is a hydrocarbon acyl group containing between 2 and 30 carbon atoms and the thiol portion of the thioester is a hydrocarbon thiol group containing between 1 and 24 carbon atoms.

The amount of thioester can vary between 0.5 and 50 mole percent based on the olefin, with preferred concentrations between 5 and 20 mole percent.

The reaction temperature, pressure, time and procedure will generally be the same as those given above.

The invention will be further described with reference to the following examples.

In all of the experimental work, the alpha-olefin (octene-1), azo compound initiator, finely divided nickel promotor (where employed), and thioacetic acid (where employed) were charged together into a 300-milliliter 316 stainless steel autoclave equipped with a stirrer, cooling means, thermowell and pressure gauge. The autoclave was sealed, and liquid hydrogen sulfide added until the molar ratio of hydrogen sulfide to octene-1 was 4:1. The autoclave was heated rapidly (15 minutes) with vigorous stirring to reaction temperature (83° C. unless indicated otherwise) and maintained at reaction temperature for three hours. The octene-1 was dried carefully (unless otherwise indicated) by standing overnight while in contact with magnesium perchlorate, and water analysis by the Karl Fischer technique indicated less than 50 p.p.m. water. The finely divided nickel catalyst was in the form of a reduced powder. A C.P. (Certified Pure) liquid hydrogen sulfide was used as received. Thioacetic acid was the thioester precursor used in some of the following examples. The thioacetic acid is known to react rapidly and quantitatively with an alpha-olefin under the reaction conditions employed, to yield a thioester, which in the following examples was n-octyl thiolacetate. Analysis of the reaction products from the runs using thioacetic acid showed the presence of 65–70 mole percent of the theoretical amount of n-octyl thiolacetate expected. The reaction products from all of the runs were analyzed by the technique of gas chromatography.

Example 1

In the run for this example, 27 weight percent powdered nickel based on the octene-1 was employed. The mole percent conversion of the octene-1 was 25. The results are summarized in Table I below.

Example 2

In the run for this example, one mole percent alpha, alpha' - azodiisobutyronitrile (hereafter called VAZO) based on the octene-1 was employed. The conversion of octene-1 was 44 mole percent. The results of the run are also summarized in Table I below.

Example 3

In the run for this example, one mole percent VAZO and 27 weight percent powdered nickel were employed. The conversion of octene-1 was 99 mole percent. The results are summarized in Table I below.

TABLE 1.—ADDITION OF HYDROGEN SULFIDE TO DRY OCTENE-1 (LESS THAN 50 P.P.M. WATER)

| Ex. No. | Nickel, Wt. percent | VAZO, Mole percent | Thioacetic Acid-Mole, percent | Conversion, Mole percent | Efficiency to— | | | | | | Mole Ratio: Mercaptans/ Sulfides |
|---|---|---|---|---|---|---|---|---|---|---|---|
| | | | | | Mercaptans | | Sulfides | | | | |
| | | | | | $^1$ R$_1$—SH | $^2$ R$_2$—SH | R$_1$—S—R$_1$ | R$_2$—S—R$_1$ | R$_2$—S—R$_2$ | Total | |
| 1 | 27 | | | 25 | 56 | 6.1 | 1.9 | 0.5 | ($^4$) | 65 | 27 |
| 2 | | 1 | | 44 | 71 | 6.9 | 6.3 | 2.7 | 1.3 | 88 | 7.6 |
| 3 | 27 | 1 | | 99 | 71 | 5.8 | 21 | 2.6 | ($^4$) | 101 | 3.3 |
| 4 | | $^3$ 1 | | 66 | 14 | 10 | 18 | 46 | 6.4 | 95 | 0.34 |
| 5 | 27 | $^3$ 1 | | 81 | 52 | 7.2 | 24 | 15 | 1.8 | 100 | 1.45 |
| 9 | | 1 | 10 | 32 | 65 | 5.3 | 4.1 | 5.7 | 3.1 | 90 | 5.4 |
| 10 | 27 | 1 | 10 | 99 | 82 | 6.8 | 5.6 | 2.0 | ($^4$) | 103 | 12 |

$^1$ R$_1$=CH$_3$(CH$_2$)$_6$CH$_2$—.  $^2$ R$_2$=CH$_3$(CH$_2$)$_6$CHCH$_3$.  $^3$ Tertiary-butyl peroxide used in place of VAZO.  $^4$ Trace.

A comparison of Examples 1, 2 and 3 shows the unexpected effect on conversion of the hydrogen sulfide addition to octene-1 in the conjoint presence of VAZO and finely divided nickel. The conversion with nickel alone was 25 (Example 1) while the conversion with VAZO alone was 44 (Example 2). The maximum expected conversion using both the nickel and VAZO was the additive effect of both or 69 mole percent. Unexpectedly the conversion was substantially quantitative, i.e., 99 mole percent as shown by Example 3.

Example 4

Example 2 was repeated except one mole percent tertiary-butyl peroxide was employed in place of the VAZO and the reaction temperature was increased to 150° C. A temperature of 150° C. was chosen for Example 4 so as to maintain the same rate of radical formation from the tertiary-butyl peroxide based on theoretical considerations as was obtained from the VAZO at 83° C. The conversion of octene-1 was 66 mole percent. The results are also summarized in Table I above.

Example 5

Example 4 was repeated except 27 weight percent nickel based on the octene-1 was also added. The conversion of octene-1 was 81 mole percent. The results are summarized in Table 1 above.

A comparison of Example 5 with Examples 1 and 4 shows the conversion of octene-1 in the conjoint presence of an organic peroxide (tertiary-butyl peroxide) and nickel was less (81 percent) than the summation of the conversions (91 percent) using the nickel (Example 1) and peroxide (Example 4) alone. This comparison further emphasizes the unexpected effect on conversion of the addition of hydrogen sulfide to octene-1 in the conjoint presence of VAZO and nickel as discussed for Examples 1, 2 and 3 above.

Example 6

Example 1 was repeated except the octene-1 was wet, containing between 800 and 1000 p.p.m. of water as analyzed by the Karl Fischer technique. The conversion of octene-1 was 35 mole percent. The results are summarized in Table 2 below.

Example 7

Example 2 was repeated except the wet octene-1 of Example 6 was employed. The conversion of octene-1 was 45 mole percent. The results are summarized in Table 2 below.

Example 8

Example 3 was repeated except the wet octene-1 of Example 6 was employed. The conversion of octene-1 was 64 mole percent. The results are summarized in Table 2 below.

TABLE 2.—ADDITION OF HYDROGEN SULFIDE TO WET OCTENE-1 (800 TO 1000 P.P.M. WATER)

| Example No. | Nickel, Wt. Percent | VAZO, Mole Percent | Conversion, Mole Percent | Efficiency to— | | | | | | Mole Ratio: Mercaptans/ Sulfides |
|---|---|---|---|---|---|---|---|---|---|---|
| | | | | Mercaptans | | Sulfides | | | | |
| | | | | $^1 R_1$—SH | $^2 R_2$—SH | $R_1$—S—R | $R_2$—S—R | $R_2$—S—$R_2$ | Total | |
| 6 | 27 | | 35 | 51 | 5.5 | 2.6 | 9.8 | 2.2 | 71 | 4 |
| 7 | | 1 | 45 | 66 | 6.9 | 4.1 | 3.1 | 3.1 | 83 | 7 |
| 8 | 27 | 1 | 64 | 71 | 6.1 | 14 | 3.1 | 0.80 | 95 | 4.5 |

$^1 R_1 = CH_3(CH_2)_6CH_2$—. $^2 R_2 = CH_3(CH_2)_5CHCH_3$.

A comparison of Examples 6, 7 and 8 shows that although there is an increase in conversion of wet octene-1 in the conjoint presence of VAZO and nickel (Example 8), the increase in conversion is less than would be expected by the additive effect of both nickel and VAZO alone, i.e. 35 plus 45 or 80 percent expected compared to the 64 percent actually achieved. A comparison of Examples 1 through 3 with Examples 6 through 8 shows the necessity of having a substantially anhydrous system in order to obtain the benefits of the invention.

It has also been found, in accordance with the invention, that the selectivity of the process to the production of mercaptans rather than sulfides can be achieved by reacting the alpha-olefinically unsaturated organic compound with the liquid hydrogen sulfide in the conjoint presence of the azo compound initiator as defined, the finely divided elemental metal promoter from the Iron Group Metals from the Fourth Period of Group VIII of the Periodic Table, and a thioester compound as defined. This aspect of the invention is illustrated by the following examples.

Example 9

Example 2 was repeated except 10 mole percent thiolacetic acid based on the octene-1 was also employed. The conversion of octene-1 decreased to 32 percent. The results are summarized in Table I above.

Example 10

Example 3 was repeated except 10 mole percent thiolacetic acid based on the octene-1 was also employed. The conversion of octene-1 was 99 mole percent and the mole ratio of mercaptans to sulfides in the product was 12. The results are summarized in Table 1 above.

A comparison of Examples 1,2,3,9 and 10 shows the unexpected and beneficial effect of reacting the octene-1 in the conjoint presence of the VAZO, nickel and the thiolacetic acid. When the thiolacetic acid was added alone to the VAZO initiated system (Example 9), the conversion decreased (32 versus 44 percent for Example 2) and the ratio of mercaptans to sulfides in the product decreased (5.4 for Example 9 versus 7.6 for Example 2). When the thiolacetic acid was added to the nickel promoted VAZO initiated system (Example 10), the conversion did not decrease, as expected, from its already substantially quantitative level (99 mole percent in Examples 3 and 10), and the mole ratio of mercaptans to sulfides in the product did not decrease, but unexpectedly increased from 3.3 in Example 3, to 12 in Example 10. This increase in mercaptan to sulfide ratio was achieved, again, with no decrease in conversion.

The above examples illustrate the improved process of the present invention for obtaining increased conversion of alpha-olefinically unsaturated organic compounds to sulfur-containing compounds by reaction with liquid hydrogen sulfide in a substantially anhydrous system and in the conjoint presence of an azo compound initiator and a finely divided elemental Iron Group metal promoter. If it is desired to favor the production of mercaptans, the above examples illustrate the effect of employing a thioester in combination with the azo and nickel compounds in an anhydrous system to achieve this result.

One of the advantages of the process of this invention is that the mercaptans which are produced are predominately the primary mercaptans. The reaction of hydrogen sulfide with an alpha-olefin produces basically two types of sulfur-containing products, namely mercaptans and sulfides. The mercaptans can be either primary, secondary or tertiary mercaptans, that is, wherein the sulfur in the mercaptan is attached to a hydrogen atom and a primary, secondary or tertiary carbon respectively. The primary mercaptans can be made only under free-radical conditions and are more desirable than secondary and tertiary mercaptans in that they are generally more reactive and have found specialty uses as intermediates for forming products, such as, for example, surface active agents. In addition, primary mercaptans have been found to be desirable as chain-transfer agents to control the molecular weight in the curing of rubber and the production of specialty polymers. While some secondary mercaptans do form in the process of this invention, it is preferred to produce a product having as high a ratio of primary to secondary mercaptans as possible. It has been found that the addition of the nickel promoter and the thioester catalyst has, if anything, a beneficial effect on increasing the molar ratio of primary to secondary mercaptans.

Resort may be had to such variations and modifications as fall within the spirit of the invention and the scope of the appended claims.

I claim:

1. A process for the production of mercaptans and monosulfides which comprises reacting an alpha-olefinically unsaturated organic compound selected from the group consisting of hydrocarbons; hydrocarbons substituted with chlorine, nitro groups, and —$NH_2$ groups; and hydrocarbons containing ether and thioether linkages under substantially anhydrous conditions with liquid hydrogen sulfide in the conjoint presence of an acyclic azo initiator and at least one finely divided elemental metal from the Iron Group metals of the Fourth Period of Group VIII of the Periodic Table at a temperature sufficient to decompose said azo initiator into free radicals and under a reaction pressure sufficient to maintain said hydrogen sulfide in the liquid phase.

2. A process for the production of mercaptans and monosulfides which comprises reacting an alpha-olefinically unsaturated hydrocarbon having between 2 and 30 carbon atoms under substantially anhydrous conditions with liquid hydrogen sulfide in the conjoint presence of an acyclic azo initiator, and a finely divided elemental metal from the Iron Group metals of the Fourth Period of Group VIII of the Periodic Table at a temperature sufficient to decompose said azo initiator into free radicals and under a reaction pressure sufficient to maintain said hydrogen sulfide in the liquid phase.

3. A process according to claim 2 wherein the amount of said azo compound is between 0.25 and 5 mole percent based on the unsaturated hydrocarbon and the amount of metal is between 1 and 50 weight percent based on the unsaturated hydrocarbon.

4. A process according to claim 2 wherein the azo compound is an azobis(cyanoalkane) having between 4 and 11 carbon atoms.

5. A process according to claim 4 wherein the metal is nickel.

6. A process according to claim 5 wherein the azo compound is alpha,alpha'-azodiisobutyronitrile.

7. A process according to claim 5 wherein the alpha-olefin is octene-1.

8. A process for the production of mercaptans and monosulfides which comprises reacting an alpha-olefinically unsaturated organic compound selected from the group consisting of hydrocarbons; hydrocarbons substituted with chlorine, nitro groups, and —$NH_2$ groups; and hydrocarbons containing ether and thioether linkages under substantially anhydrous conditions with liquid hydrogen sulfide in the conjoint presence of an acyclic azo initiator, at least one finely divided elemental metal from the Iron Group metals of the Fourth Period of Group VIII of the Periodic Table, and a thiolester wherein the acyl portion of the thiolester is a hydrocarbon acyl group containing between 2 and 30 carbon atoms and the thiol portion of said thiolester is a hydrocarbon thiol group containing between 1 and 24 carbon atoms.

9. A process according to claim 8 wherein the thiolester is a monothiolester.

10. A process for the production of mercaptans and monosulfides which comprises reacting an alpha-olefinically unsaturated hydrocarbon having between 2 and 30 carbon atoms under substantially anhydrous conditions with liquid hydrogen sulfide in the presence of an acyclic azo initiator, at least one finely divided elemental metal from the Iron Group metals of the Fourth Period of Group VIII of the Periodic Table, and a thiolester wherein the acyl portion of the thiolester is a hydrocarbon acyl group containing between 2 and 30 carbon atoms and the thiol portion of said thiolester is a hydrocarbon thiol group containing between 1 and 24 carbon atoms.

11. A process according to claim 9 wherein the amount of said azo compound is between 0.25 and 5 mole percent based on the unsaturated hydrocarbon and the amount of metal is between 1 and 50 weight percent based on the unsaturated hydrocarbon.

12. A process according to claim 9 wherein the azo compound is an azobis(cyanoalkane) having between 4 and 11 carbon atoms.

13. A process according to claim 11 wherein the metal is nickel.

14. A process according to claim 12 wherein the azo compound is alpha,alpha'-azodiisobutyronitrile.

15. A process according to claim 12 wherein the alpha-olefin is octene-1.

16. A process according to claim 11 wherein the thioester is n-octylthiolacetate.

17. A process for the production of mercaptans and monosulfides which comprises reacting octene-1 having less than 50 p.p.m. of water with liquid substantially anhydrous hydrogen sulfide in the presence of alpha,alpha'-diisobutyronitrile, finely divided nickel and thiolacetic acid.

References Cited

UNITED STATES PATENTS

| | | | |
|---|---|---|---|
| 2,551,813 | 5/1951 | Pinkney | 260—609 |
| 3,045,053 | 7/1962 | Ford | 260—609 |

OTHER REFERENCES

Reid: Organic Chemistry of Bivalent Sulfur, vol. 1, p. 21.

CHARLES B. PARKER, *Primary Examiner.*

D. R. PHILLIPS, *Assistant Examiner.*

UNITED STATES PATENT OFFICE
CERTIFICATE OF CORRECTION

Patent No. 3,397,243                                             August 13, 1968

George F. Kite

It is certified that error appears in the above identified patent and that said Letters Patent are hereby corrected as shown below:

Column 1, line 41, "insaturated" should read -- unsaturated --. Column 2, line 59, cancel "time". Columns 5 and 6, in the footnote to TABLE 1, "$R_2=CH_3(CH_2)_6CHCH_3$" should read -- $R_2=CH_3(CH_2)_5\overset{|}{C}HCH_3$ --. Columns 7 and 8, in the footnote to TABLE 2, "$R_2=CH_3(CH_2)_5CHCH_3$" should read -- $R_2=CH_3(CH_2)_5\overset{|}{C}HCH_3$ --. Column 9, line 30, and column 10, line 5, after "atoms", each occurrence, insert -- at a temperature sufficient to decompose said azo initiator into free radicals and under a reaction pressure sufficient to maintain said hydrogen sulfide in the liquid phase --. Column 10, lines 6 and 11, the claim reference numeral "9", each occurrence, should read -- 10 --; line 14, the claim reference numeral "11" should read -- 12 --; lines 16 and 18, the claim reference numeral "12", each occurrence, should read -- 13 --; line 20, the claim reference numeral "11" should read -- 12 --.

Signed and sealed this 13th day of January 1970.

(SEAL)
Attest:

EDWARD M. FLETCHER, JR.                          WILLIAM E. SCHUYLER, JR.
Attesting Officer                                          Commissioner of Patents